US006024369A

United States Patent [19]

Goldstein et al.

[11] Patent Number: 6,024,369

[45] Date of Patent: Feb. 15, 2000

[54] SPECIALIZED WHEELCHAIR FOR A PARAPLEGIC FENCER

[75] Inventors: Bernard Goldstein, 24311 Majestic St., Oak Park, Mich. 48237; Jonathan Riddle, Ferndale, Mich.

[73] Assignee: Bernard Goldstein, Oak Park, Mich.

[21] Appl. No.: 09/002,667

[22] Filed: Jan. 5, 1998

[51] Int. Cl.[7] .......... B62M 1/14

[52] U.S. Cl. .......... 280/248; 280/257; 280/250.1

[58] Field of Search .......... 280/250.1, 242.1, 280/244, 247, 248, 249, 253, 257, 256

[56] References Cited

U.S. PATENT DOCUMENTS

| | | | |
|---|---|---|---|
| 647,863 | 4/1900 | Nachtwey | 280/245 |
| 838,228 | 12/1906 | Williams | 280/7.15 |
| 1,181,234 | 5/1916 | McCord | 280/225 |
| 1,492,597 | 5/1924 | Gilbert | 180/247 |
| 1,503,832 | 8/1924 | Hubbard | 280/234 |
| 1,872,289 | 8/1932 | Hester | 280/240 |
| 1,929,081 | 10/1933 | Serpico | 280/222 |
| 2,928,682 | 3/1960 | Spencer et al. | 280/202 |
| 3,642,320 | 2/1972 | Ward | 297/345 |
| 3,953,054 | 4/1976 | Udden et al. | 280/250.1 |
| 4,583,758 | 4/1986 | Runion et al. | 280/644 |
| 4,595,212 | 6/1986 | Haury et al. | 280/242 |
| 4,641,848 | 2/1987 | Ayers | 280/242 |
| 4,840,076 | 6/1989 | Brubaker et al. | 74/143 |
| 5,007,655 | 4/1991 | Hanna | 280/250.1 |
| 5,028,064 | 7/1991 | Johnson | 280/250.1 |
| 5,490,686 | 2/1996 | Clouse | 280/247 |
| 5,499,833 | 3/1996 | Her et al. | 280/247 |

*Primary Examiner*—Lanna Mai
*Assistant Examiner*—Andrew J. Fischer

[57] ABSTRACT

A fencing sports wheelchair includes a seat (1) mounted to a base (2). A pedestal (3) underlying the base such that the base is selectively rotatable. A platform (10) having an upper surface to which the pedestal is affixed and having a lower surface. At least three wheels are mounted to the platform so that the wheels extend beneath the lower surface of the platform. In addition to a lever means for converting single-handed manual motion into forward and backward translation of said platform.

8 Claims, 3 Drawing Sheets

FIG-2
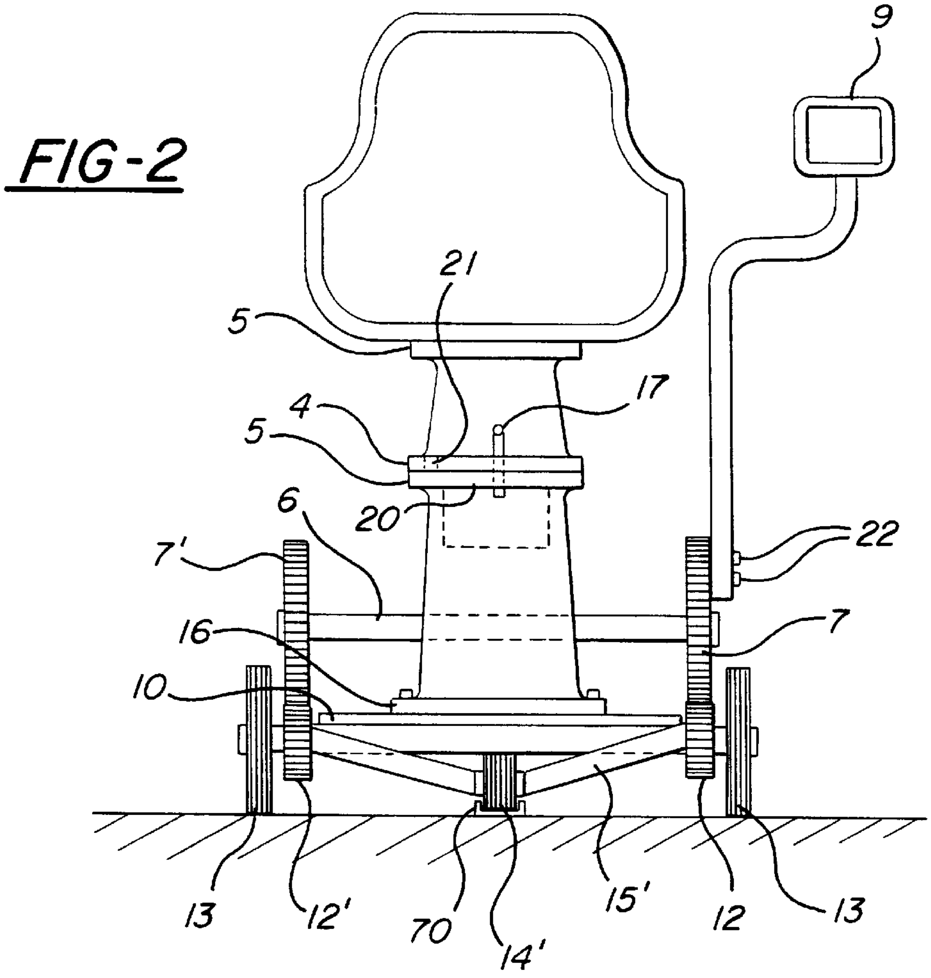
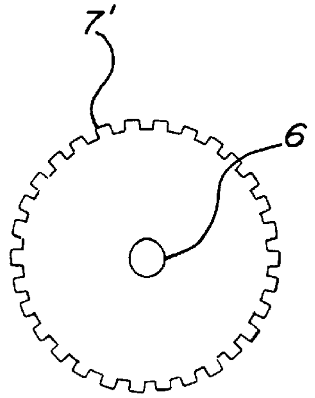
FIG-3A
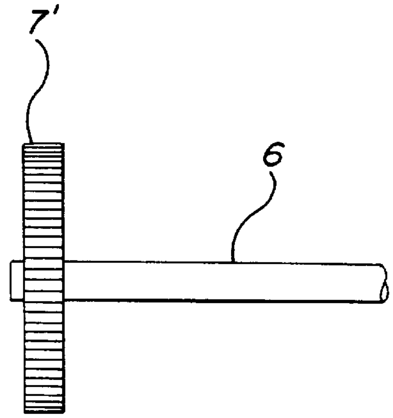
FIG-3B

SPECIALIZED WHEELCHAIR FOR A PARAPLEGIC FENCER

FIELD OF THE INVENTION

A purpose-designed wheelchair is described herein which is amenable to the movement associated with the sport of fencing as practiced by paraplegic fencers.

BACKGROUND OF THE INVENTION

Presently, in use is the standard type of wheelchair which must be bolted to a low wooden platform which prohibits any forward or backward motion and, hence restricts overall fencing action. With the increased participation of paraplegics in athletic events, wheelchair modifications have been patented. Except for the purpose-made racing wheelchair (U.S. Pat. No. 5,028,064), the majority of wheelchair improvements are represented by relatively minor changes in the standard design. These include, respectfully a rocking seat assembly (U.S. Pat. No. 4,641,848), a mobile body support vehicle (U.S. Pat. No. 4,583,758), a folding sports wheelchair (U.S. Pat. No. 4,595,212), and a chair with adjustable wheel camber (U.S. Pat. No. 4,166,631) One additional chair had been designed with a lever and a pole which contacts the tire (U.S. Pat. No. 5,263,729). By moving the lever forward, the chair is made to move forward, and this eliminates the need to use the handrails attached to the main wheels.

The sport of fencing takes place on a strip 14 meters long by 2 meters wide. As such, lateral movement is limited. Most of the fencing action occurs essentially within the distance of the extended arm plus blade length. The latter being approximately 0.9 meters in length. The athletes converge to this distance through rapid lunging and rushing leg motions. The majority of leg motions consist of short advances and retreats accompanied by a great deal of blade contact between opposing athletes. Presently, paraplegic fencing is conducted on a low raised platform to which the wheelchairs are affixed just within the athlete's extended arm length plus the blade length relative to the opposing athlete. Although the blade action of the paraplegic fencer is the same as that of the non-handicapped fencer, the lack of forward and rearward movement limits the strategy and intensity of the action. To overcome this limitation, the present invention relates to a purpose built wheelchair which allows limited movement that nonetheless closely simulates non-handicapped fencing action.

An object of this invention is to mimic the movement component of non-handicapped fencing for the paraplegic athlete. This is achieved by allowing for limited linear motion of the wheelchair with the use of only the non-weapon hand of the paraplegic fencer.

SUMMARY OF THE INVENTION

The wheelchair of the instant invention is adapted for use in the sport of fencing and includes: a seat mounted to a base; a pedestal underlying the base such that the base is selectively rotatable; a platform having an upper surface to which the pedestal is affixed and having a lower surface; a least three wheels mounted to the platform so that the wheels extend beneath the lower surface of the platform; and a lever means for converting single-handed manual motion into forward and backward translation of said platform.

BRIEF DESCRIPTION OF THE DRAWINGS

FIG. 2 is a partial cut-away rear view of the wheelchair shown in FIG. 1;

FIG. 3 is a side view and frontal view of the gear shaft that extends transversely through the pedestal of the wheelchair shown in FIG. 1;

DETAILED DESCRIPTION OF THE INVENTION

Figure 4B:
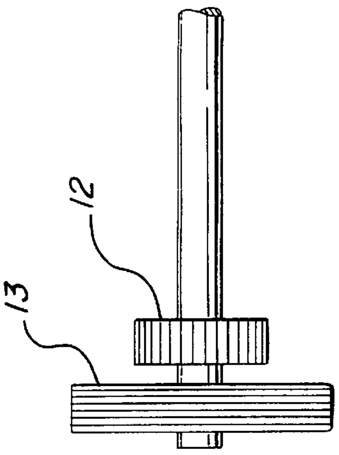
FIG. 4 is a side view and a transverse central view of the drive wheel shaft of the wheelchair shown in FIG. 1.
Figure 1:
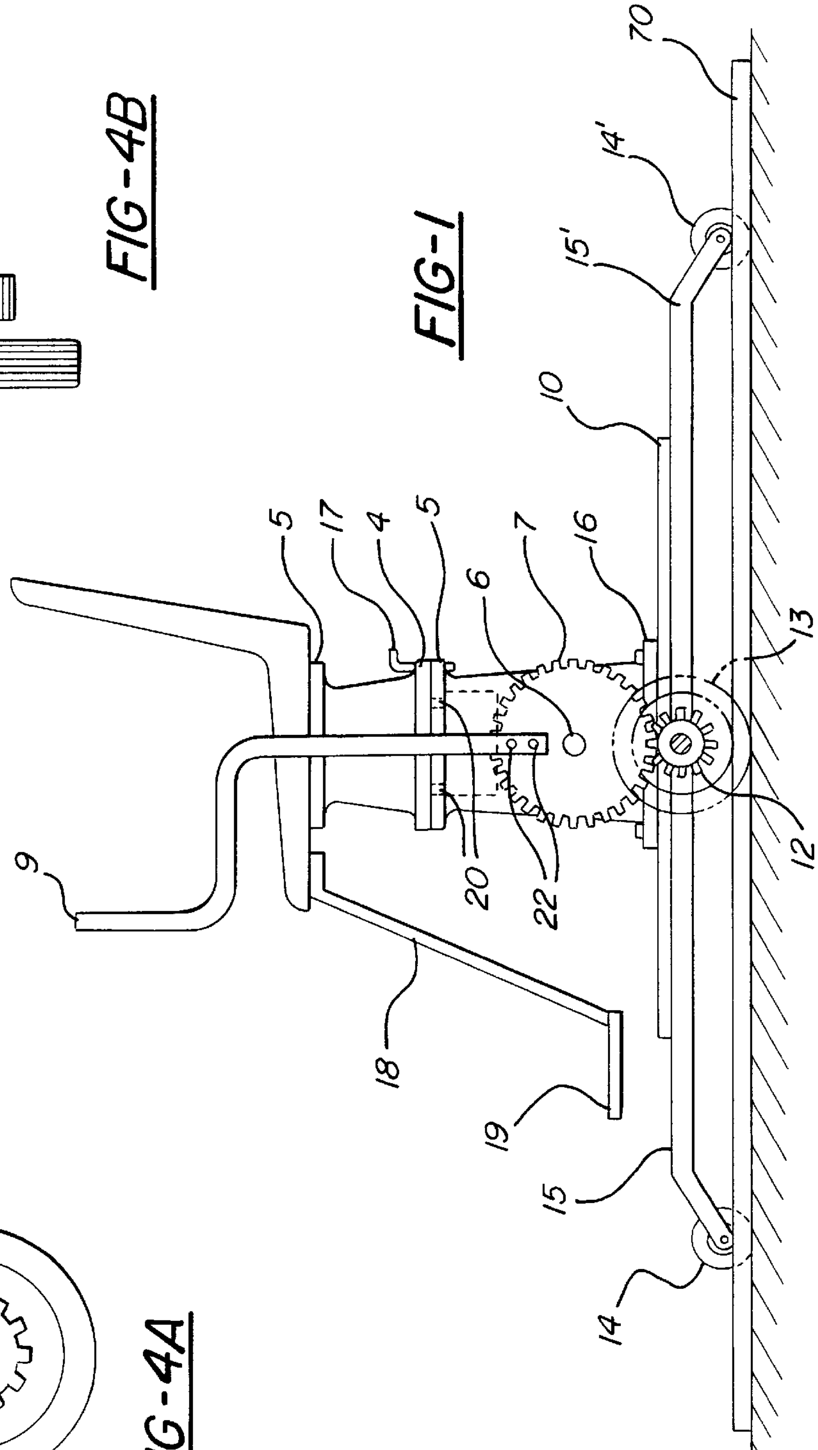
FIG. 1 is a partial cut-away side view of a wheelchair encompassing a embodiment of the instant invention.
Figure 4A:
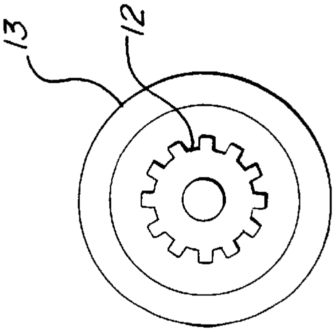
Figure 5:
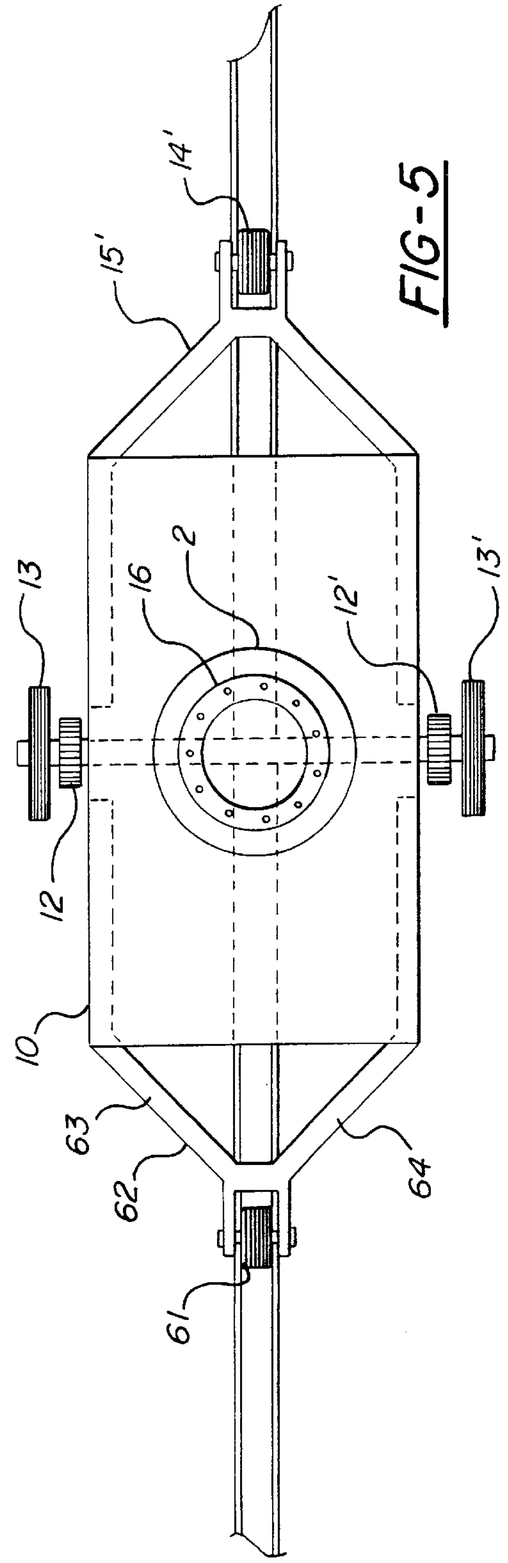
FIG. 5 is a partial cut-away overhead view of a wheelchair encompassing a embodiment of the wheelchair shown in FIG. 1.

In reference to FIGS. 1 and 2, a seat 1 is affixed on top of a base 2. The seat is preferably constructed of a thermoplastic or fiberglass resinous material and optionally equipped with a lap belt (not shown) to secure the athlete in the seat 1. The seat 1 is furthermore optionally fitted with a leg support 18 terminating in a footrest 19. The base 2 is selectively secured into a rotational position relative to an underlying pedestal 3. The pedestal 3 terminates on top with a flange 5 and on the bottom with a flange 16. The rotation of the base 2 and the affixed seat 1 relative to the pedestal 3 facilitates operation of the wheelchair by athletes of either handedness. The bottom of the base 2 terminates in a flange 4. The base flange 4 has a central hole and a series of holes about the circumference (not shown). The central hole of the base flange 4 aligns with a similar central hole in the top pedestal flange 5. The aligned central holes in the base flange 4 and the top pedestal flange 5 define a rotation axis about which the base 2 and thereby the affixed seat 1 swivels. An axle pin and bushing (not shown) serve to couple the base flange 4 and the top pedestal flange 5 while facilitating rotation. The top pedestal flange 5 has a series of holes about its circumference 20. Upon rotation of the base 2, at least one of the top pedestal flange circumference holes 20 aligns with a similar base flange hole 21. A key 17 is inserted through the aligned top pedestal and base flange holes to selectively lock the relative position of the base 2 relative to the pedestal 3.

The bottom pedestal flange 16 is affixed to the upper surface of a wheelchair platform 10. The platform 10 translates over the floor surface by means of at least three wheels mounted thereto so as the be rotatable. The wheel arrangement is discussed in greater detail below.

A transverse hole through the pedestal 3 contains a rotatable shaft 6 that extends beyond the pedestal bottom flange width and beyond the width of the platform 10. The shaft 6 is supported within the pedestal 3 on a suitable bushing (not shown) and a means provided for retaining the shaft 6 within the pedestal 3. As shown in FIGS. 1, 2 and 3, on both ends of the shaft 6, gears 7 and 7' are affixed. The shaft 6 is optionally slotted or splined for the insertion of a key so as to prevent gear slippage about the shaft axis. The gears 7 and 7' are adapted for the attachment of a hand lever 9 by means of screws 22. Preferably, the hand lever is ergonomically bent and shaped.

Enmeshed with gears 7 and 7' are drive gears 12 and 12', respectively. Drive gears 12 and 12' are mounted on either of an axle 8 and on either side of the platform 10. The axle 8 is terminated on both ends with wheels, such that externally adjacent to drive gear 12 is a wheel 13 and externally adjacent to drive gear 12' is a wheel 13'. The shaft 8 is mounted to the platform on a suitable bushing, and terminated with suitable hubs (not shown). The shaft 8 is optionally slotted or splined for the insertion of a key (not shown) so as to prevent drive gear slippage about the shaft axis. Preferably, the shaft 8 is mounted near the center of gravity in embodiments in which the platform 10 rolls on four wheels (i.e. where there are both front and rear stabilization wheels) and the shaft 8 is mounted on the opposite end of the center of gravity from the stabilization wheel in embodiments in which the platform 10 rolls on three wheels.

At least one stabilization wheel and preferably two stabilization wheels, a front stabilization wheel 14 and a rear stabilization wheel 14' are mounted to the front and rear surfaces of the platform 10 by means of support struts 15 and 15', respectively. The stabilization wheels 14 and 14' are preferably low friction, lightweight and rimmed with a material sufficiently soft to prevent marring of conventional athletic venue floor surfaces. Preferably, the support struts are tubular metal elements. More preferably, the support struts 15 and 15' are removable to facilitate storage and shipment of the wheelchair.

Figure 6:
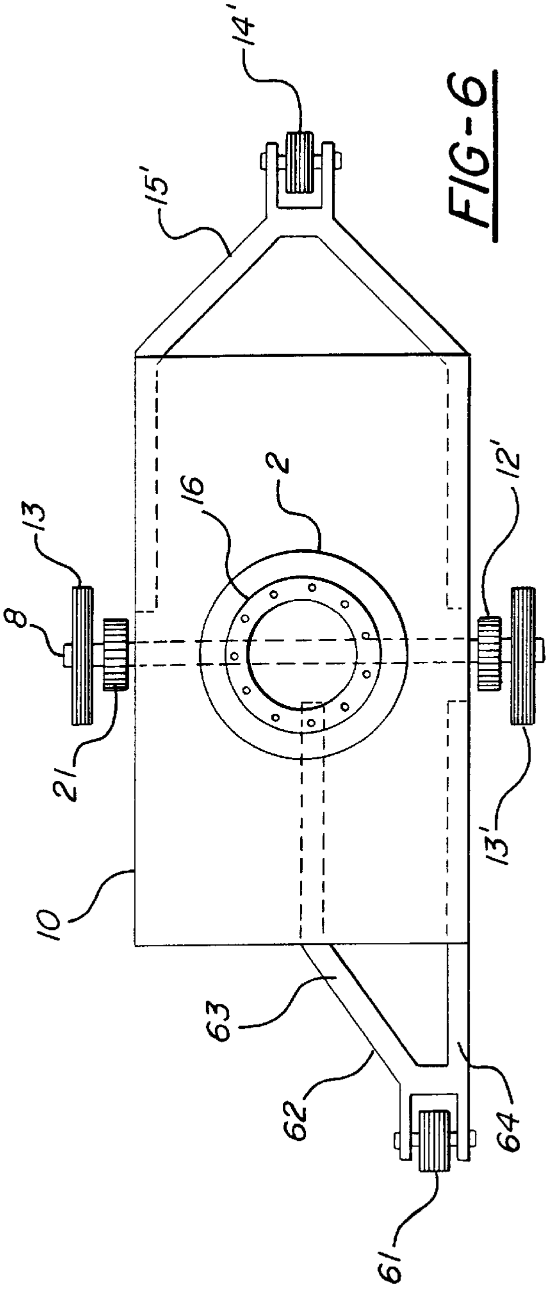
FIG. 6 is a partial cut-away overhead view of a wheelchair encompassing another embodiment of the instant invention.

In another embodiment of the invention, shown in FIG. 6, a front stabilization wheel 61 is affixed to a offset strut 62. The offset strut 62 affords the opportunity for two opposing athletes seated in wheelchairs of this embodiment to decrease the distance between their respective wheelchairs to about the one platform length (one half of each wheelchair) so as to engage in in-fighting. The distance between the strut members 63 and 64 is sufficiently narrow to allow for the complementary movement of opposing wheelchairs, yet the distance therebetween still affords stability to a wheelchair platform.

The gearing system functions such that radially motion applied to the lever 9 results in rotation of gears 7 and 7' about shaft 6, thereby transferring torque to drive gears 12 and 12', which results in transitional motion of wheels 13 and 13'. The gearing ratio between enmeshed gear pairs 7–12 and 7'–12' is such that the range of lever motion of a typical athlete yields about 1 meter of travel of the wheelchair platform 10. Preferably, the wheels 13 and 13' are about 7 to 12 inches in diameter.

It is appreciated that modified gearing may readily supplement or supplant the configuration of the instant invention such that radial motion of the lever toward and away from the seated athlete, using the non-weapon hand, results in forward and rearward motion, respectively. For example, sprockets may replace gears and drive gears and torque transferred between the sprockets by a chain means; a handle engaging one of the sprockets such that a range of handle motion corresponds to about 1 meter of wheelchair platform travel.

It is observed that the wheelchairs of the instant invention may swerve during linear translational motion. In such instances, a track 70 is optionally affixed to the fencing strip surface in order to provide a linear guide in which at least one of the wheels of the wheelchair travels.

It is appreciated that various modifications of the instant invention in addition to those shown and described herein will be apparent to those skilled in the art from the above description. Such modifications are also intended to fall within the scope of the appended claims.

What is claimed is:

1. A wheelchair adapted for use in the sport of fencing comprising:

a platform having an upper surface and lower surface, a front end, a back end, a first side and a second opposing side which together define a platform width and platform lateral center;

at least three wheels extending beneath the lower surface of said platform;

a pedestal having a top face, a bottom face and a pedestal width, wherein the bottom face is affixed to the upper surface of said platform;

a seat affixed to the top face of said pedestal; and a single lever positioned on the first side at a distance from the platform lateral center greater than the pedestal width translating said platform wherein said single lever is affixed to a first gear, said first gear enmeshing at least one drive gear, thereby rotating one of said at least three wheels so as to translate said platform.

2. The wheelchair of claim 1 wherein said lever is ergonomically bent to facilitate single-handed manual motion of said lever.

3. The wheelchair of claim 1 wherein four wheels extend beneath the lower surface of said platform.

4. The wheelchair of claim 1 wherein a first wheel is mounted forward of the front end of said platform, a second wheel is mounted rearward of the back end of said platform, and third and fourth wheels are mounted on an axle adjacent to the lower surface of said platform.

5. The wheelchair of claim 1 wherein said first wheel is offset mounted forward of the front end of said platform.

6. The wheelchair of claim 4 wherein a first wheel is mounted on a support strut, said strut being selectively affixed to said platform.

7. The wheelchair of claim 1 wherein said seat is selectively rotatable.

8. An improved wheelchair adapted for use in the sport of fencing having at least three wheels adapted to contact an underlying floor, a seat having a width supported above said at least three wheels on a base having a center, a first side and a second opposing side wherein the improvement lies in: a single lever positioned on the first side of the base at a distance of greater than the seat width wherein said single lever is affixed to a first gear, said first gear enmeshing at least one drive gear, thereby rotating one of said at least three wheels so as to translate said platform.

* * * * *